United States Patent Office 3,143,416
Patented Aug. 4, 1964

3,143,416
LIGHT SENSITIVE COATINGS FOR SCREEN PRINTING COMPRISING A LIGHT SENSITIVE MATERIAL WITH A CONDENSATE OF A $\omega,\omega'$-DIAMINE AND A $\omega,\omega'$-DICARBOXYLIC ACID
Maximilian Karl Reichel and Wilhelm Neugebauer, Wiesbaden-Biebrich, Germany, assignors, by mesne assignments, to Azoplate Corporation, Murray Hill, N.J., a corporation of New Jersey
No Drawing. Filed Sept. 21, 1960, Ser. No. 57,414
Claims priority, application Germany Oct. 2, 1959
17 Claims. (Cl. 96—35)

The present invention relates to reproduction coatings for screen printing which consist, basically, of a nylon-type N-alkoxymethylated polyamide, obtained by polycondensation of a $\omega,\omega'$-diamine and a $\omega,\omega'$-dicarboxylic acid, and made light-sensitive by means of a bichromate, certain aromatic azides or a diazonium borofluoride.

In the screen printing process, stencils are used which normally consist of a porous support over which there is a coating in the non-printing portions so that when the stencil is placed on an article to be printed and color is applied, only the image portions print through the porous support.

For the preparation of the screen-printing stencils, the porous support is covered with a light-sensitive coating and when exposed to light, the portions affected by the light become tanned, and hence insoluble, while the portions unaffected by the light can be readily removed by washing with a solvent, such as water.

As supports for the stencils, porous materials such as paper, Japanese-fiber paper or tissues made of glass fiber or natural or synthetic textile fibers or metal thread may be used.

For the light-sensitive coating, water-soluble natural colloids, e.g., gelatine, fish glue and casein, or synthetic water-soluble polymers, such as polyvinyl alcohol, polyvinyl pyrrolidone, polyacrylic acid and polyacrylic acid amides have been used, to which bichromate or aromatic azido compounds have been added to impart light-sensitivity. These coatings have poor mechanical strength and require an after treatment if they are to be satisfactory for industrial use.

The production of screen-printing stencils of greater mechanical stability has also been attempted by the use of synthetic polyamide mixed condensates formed by the mutual polycondensation of several monomeric reaction components, e.g., at least one $\omega,\omega'$-dicarboxylic acid, an equal quantity of at least one $\omega,\omega'$-diamine and at least one $\omega$-aminocarboxylic acid, the proportion of $\omega$-aminocarboxylic acid in the polycondensate being 20–50 percent, preferably 20–40 percent by weight. These mixed condensates have not, however, proved acceptable in practice because they are soluble only in alcohol heated to at least 55–65° C. Involving as it does the use of so hot a volatile solvent, development of the screen printing stencils after the exposure thereof to light is accompanied by such a large quantity of noxious and inflammable fumes that safe working conditions are not possible. Moreover, in practice, the complete removal of those portions of the coating not affected by the light is difficult. Because of the insolubility thereof, pure polyamides such as poly-$\epsilon$-caprolactam and polyadipic acid hexamethylene diamine are not used.

Light-sensitive coatings for screen printing have now been found which contain at least one polyamide and contain, as polyamides, N-alkoxymethylated products of partially broken down polycondensates of $\omega,\omega'$-diamines with $\omega,\omega'$-dicarboxylic acids which are soluble at low temperatures.

For the preparation of the N-alkoxymethylated polycondensates, produced from a $\omega,\omega'$-diamine and a $\omega,\omega'$-dicarboxylic acid, an ordinary commercial nylon-type polyamide with a K-value of about 70–72 (for K-value, see W. Schäfer, Einführung in das Kunststoffgebiet (Introduction to the Plastics Field), Akademische Verlagsgesellschaft, Leipzig (1951), p. 104) and an intrinsic viscosity ($\eta$) of 0.80 to 0.90, preferably 0.84 to 0.89 is used.

The nylon-type polyamide used as a starting material is partially depolymerized, by heating in the presence of strong inorganic acids, and then N-alkoxymethylated. Products are thus formed which have a K-value of about 30 to 60 and an intrinsic viscosity ($\eta$) of 0.43 to 0.62 and are 20–35 percent, preferably 25–30 percent, N-alkoxymethylated at the acid amide groups.

The N-alkoxymethylation of the nylon-type polyamide is, for example, effected as follows: 30 parts by weight of polyadipic acid hexamethylene diamine (K value, 71.3; intrinsic viscosity ($\eta$), 0.88) are dissolved over a period of 3 hours in a mixture of 150 parts by volume of 90 percent formic acid and 25 parts by volume of concentrated hydrochloric acid (or 10 parts by volume of concentrated sulfuric acid) on a steam bath. The solution is cooled to about 50–60° C. and then introduced, dropwise with stirring, into three liters of water having a temperature of 20° C., whereupon the partially depolymerized polyamide precipitates out in the form of a viscous mass. Stirring is continued at room temperature for about an hour, then the supernatant acid solution is decanted and the precipitated reaction product is washed a number of times with cold water. Afterwards, it is made alkaline by the addition of a 5 percent aqueous ammonia solution, washed with water until the washings are neutral and then gently dried. The broken-down polyamide thus obtained has a K-value of 58.5 and an intrinsic viscosity ($\eta$) of 0.59. The yield is nearly quantitative with respect to the starting material.

The partially alkoxymethylated products required for the light-sensitive polyamide are obtained from the broken-down products, e.g., from broken-down polyadipic acid hexamethylene diamine, in the following manner:

100 parts by weight of an adipic acid hexamethylene diamine, broken down with acid and having a K-value of 58.1 and an intrinsic viscosity ($\eta$) of 0.58, are dissolved on a steam bath in 380 parts by volume of 90 percent formic acid (or 90 percent acetic acid). The solution is then heated to 60 to 65° C. and a hot filtered solution of 300 parts by weight of paraformaldehyde in 600 parts by volume of methanol is introduced dropwise with stirring. (A catalytic quantity i.e. a few milligrams, of solid sodium hydroxide is previously added to the paraformaldehyde solution to accelerate depolymerization.) The reaction mixture is stirred for another four hours, cooled to 50 to 60° C., and then introduced into an excess of 5 percent ammonia solution, whereupon the N-methoxymethylated, partially broken-down polyamide separates out as a flaky precipitate; it is allowed to stand and then the supernatant liquid is decanted. The process is repeated several times with cold water; the precipitate is separated by suction filtration, washed until the washings are neutral and then dried in the air. The polyamide thus obtained has a K-value of 57.8, an intrinsic viscosity ($\eta$) of 0.58, and a methoxy group content of 6–8 percent. The yield is nearly quantitative based upon the non-methoxymethylated product. The product is readily soluble at room temperature in 60 to 80 percent aqueous ethanol; ethyl, allyl or propyl alcohol can be used instead of methanol for the N-alkoxymethylation with similar results. With these alcohols and an equal degree of N-alkoxymethylation, the physical and chemical properties correspond very largely to those of the products obtained with methanol.

Instead of the polyadipic acid hexamethylene diamine, other broken-down nylon-type polyamides can also be used, e.g., polysebasic acid hexamethylene diamine or poly-$\gamma$-keto-pimelic acid hexamethylene diamine.

The N-alkoxymethylation products are soluble in water/alcohol mixtures, the extent of solubility being a function of the degree of N-alkoxy methylation. This, in turn, is dependent on the proportion of paraformaldehyde to polyamide used. With proportions up to one part by weight of polyamide to 1.2 parts by weight of paraformaldehyde, the resultant reaction product is not completely soluble in 60 percent aqueous alcohol at 55–65° C. If 2.5 parts by weight of paraformaldehyde are used to one part by weight of the polyamide, products are obtained which are completely soluble in 60 percent ethyl alcohol at 50–65° C. N-alkoxymethylation products which are completely soluble in 60 percent alcohol at room temperature are obtained if in the reaction 3 to 4.5 parts by weight of paraformaldehyde are used to each part by weight of polyamide.

For the preparation of the light-sensitive coatings for screen printing, a solution containing about 7.5 to 10 percent (according to the pore size of the porous support) of N-alkoxymethylated polyamide is used. With 30 to 96 percent ethyl alcohol, the solutions have a viscosity, at 23° C., of 35–75 centipoises, by the Ubbelhode-Holde method of measurement.

The porous support is coated with the solution in known manner and the solvent is evaporated. In order that the N-alkoxymethylated broken-down polyamide will acquire the property of becoming insoluble when exposed to light, either bichromate e.g., ammonium bichromate or p-azidostyryl-benzene compounds, or p-azidostyryl-ketones or light-sensitive diazonium salts soluble in organic solvents, e.g., diazonium borofluorides, are added thereto. Also, mixtures of the above compounds may be used, provided the compounds selected are compatible. These sensitizing compounds are added to the polyamide in proportions of about 1:4 to 1:10, calculated on the basis of the dry weight of the substituted polyamide.

The screen-printing stencils provided with a light-sensitive layer, and exposed to light under a master, are treated with aqueous alcohol, e.g., 60–80 percent ethyl alcohol at room temperature to remove the unexposed portions of the coating. Alcohol/water mixtures containing less than 40 percent of alcohol are less satisfactory; the alcohol may be denatured, or, instead of ethyl alcohol, other lower aliphatic alcohols, e.g., methyl, propyl or isopropyl alcohol, may be used. They are mixed with water in the same proportion as is ethyl alcohol. As supports, the base materials already described, which are normally used in screen printing and film printing, can be employed.

Aromatic azido compounds suitable for the sensitization are described in German Patent No. 752,852, and in German Patent No. 954,308. They are products the molecules of which contain at least one azido group and in para position thereto a vinyl group or a substituted vinyl group. These products have the following general formula:

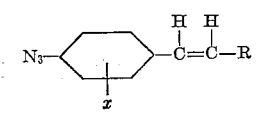

in which R is an aliphatic, aromatic, or heterocyclic radical, e.g.,

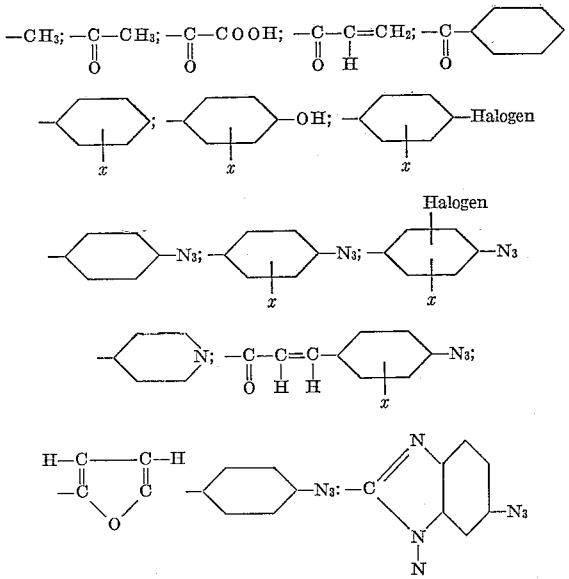

$x$ is hydrogen or a —SO$_3$H or —COOH group which forms a water-soluble alkali salt, or a sulfonamide group $$-SO_2-\underset{H}{N}-aryl$$

in which aryl may also be substituted. A hydrogen of the vinyl group may be replaced by alkyl or by a carboxyl group.

A number of compounds are listed below which come under the above general formula and which are suitable for the hardening of partially broken-down nylon-type N-alkoxymethylated polyamides.

FORMULA 1

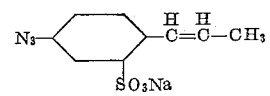

FORMULA 2

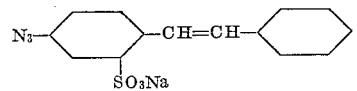

FORMULA 3

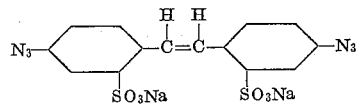

FORMULA 4

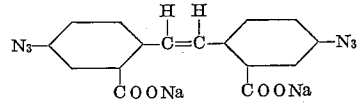

FORMULA 5

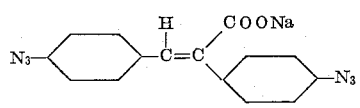

FORMULA 6

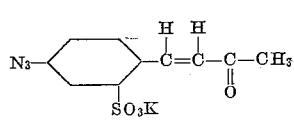

FORMULA 7
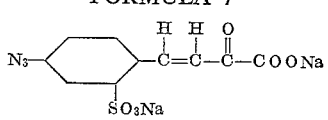

FORMULA 8
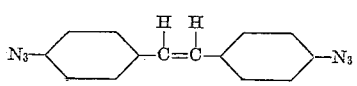

FORMULA 9
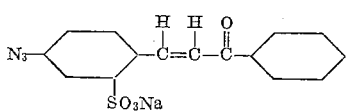

FORMULA 10
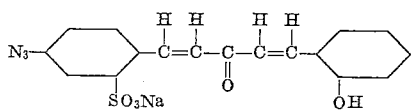

FORMULA 11
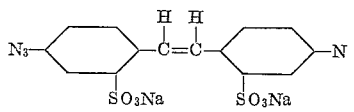

FORMULA 12
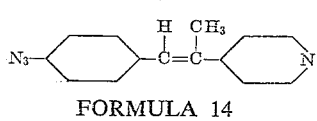

FORMULA 13
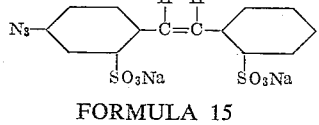

FORMULA 14
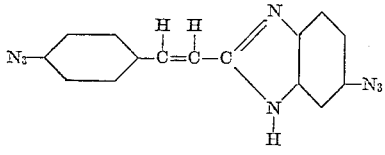

FORMULA 15
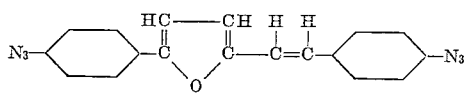

FORMULA 16
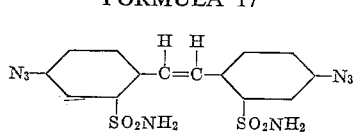

FORMULA 17

FORMULA 18
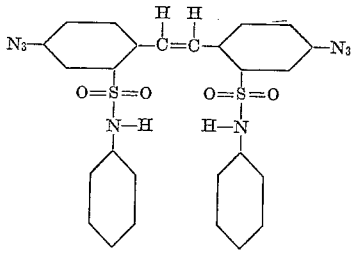

FORMULA 19
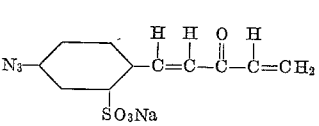

FORMULA 20
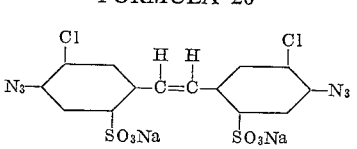

FORMULA 21
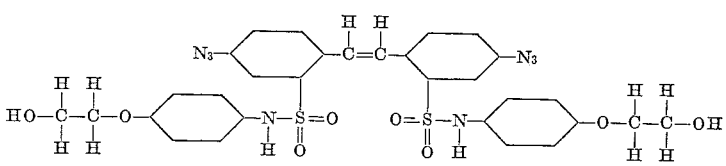

4-azido-1-ω-methyl-styryl-2-sulfonic acid sodium salt, corresponding to Formula 1, is prepared by the Meerwein method (Journal für praktische Chemie, vol. 152 (1939), pages 237–266) by condensation of crotonic acid with diazotized 4-nitro-aniline-2-sulfonic acid in the presence of cupric chloride and acetone, catalytic reduction of the nitrostyryl compound to the 4-amino-styryl compound, diazotization of the latter and, finally, conversion by means of sodium azide;

4-azido-1-ω-phenyl-styryl-2-sulfonic acid sodium salt, corresponding to Formula 2, is prepared by the process described in the Journal für praktische Chemie, vol. 152 (1939), pages 237–266. Instead of crotonic acid, cinnamic acid is used;

4,4'-diazidostilbene-2,2'-disulfonic acid sodium salt, corresponding to Formula 3;

4,4'-diazidostilbene-2,2'-dicarboxylic acid sodium salt, corresponding to Formula 4;

4,4'-diazidostilbene-α-carboxylic acid sodium salt, corresponding to Formula 5;

4-azido-benzalacetone-2-sulfonic acid sodium salt, corresponding to Formula 6;

Disodium salt of 4-azidobenzal-pyroracemic acid-2-sulfonic acid, corresponding to Formula 7;

4,4'-diazidostilbene, corresponding to Formula 8; is prepared by catalytic reduction of the dinitro compound to the diamino compound, tetrazotization of the diamino compound and conversion of the tetrazo compound with sodium azide;

4 - azidobenzal-acetophenone - 2 - sulfonic acid sodium salt, corresponding to Formula 9;

4-azido-2'-hydroxy-dibenzalacetone-2-sulfonic acid sodium salt, corresponding to Formula 10;

4 - azido - 4'-fluorostilbene-2,2'-disulfonic acid sodium salt, corresponding to Formula 11, is prepared by thermal decomposition of the diazonium borofluoride from 4-nitro-4'-aminostilbene-2,2'-disulfonic acid, catalytic reduction, diazotization and conversion with sodium azide;

4,4'-diazido-bis-(styryl-ketone)-2-sulfonic acid sodium salt, corresponding to Formula 12, is prepared by the condensation of 4-azido-benzaldehyde-2-sulfonic acid sodium salt with 4-azido-benzal-acetone in a manner analogous to that described in German Patent No. 752,852;

4 - (4' - azido-β-methyl-styryl)-pyridine, corresponding to Formula 13, is prepared by the condensation of 4-nitrobenzaldehyde with ethyl pyridine by the process described in "The Journal of the American Chemical Society," vol. 76 (1952), p. 3986–3987, catalytic reduction of the nitro compound to the amino derivative, diazotization of the latter, followed by conversion with sodium azide.

4-azidostilbene-2,2'-disulfonic acid sodium salt, corresponding to Formula 14 is prepared from 4-nitro-4'-aminostilbene-2,2'-disulfonic acid by diazotization, boiling of the diazo compound with absolute alcohol, reduction of the nitrostyryl compound, diazotization of the amino group and final conversion with sodium azide;

2-(4'-azidostyryl)-6-azido benzimidazole, corresponding to Formula 15, is prepared by condensation of 4-nitrobenzaldehyde with 2 - methyl - 5(6) - nitrobenzimidazole, catalytic reduction of the dinitro compound to the diamino compound, tetrazotization and final conversion of the tetrazo compound with sodium azide;

5 - (4' - azidophenyl)-2-(4''-azidostyryl)furan, corresponding to Formula 16, is prepared by a process analogous to that described in Example 1, cinnamic acid being used, by condensation of furyl acrylic acid with two moles of diazotized p-nitraniline, catalytic reduction of the dinitro compound to the diamino compound, tetrazotization and final conversion of the tetrazo compound with sodium azide;

4,4' - diazidostilbene-2,2'-disulfonamide, corresponding to Formula 17, is prepared from 4,4'-dinitro-stilbene-2,2'-disulfonyl chloride by reaction with ammonia, reduction of the nitro groups to amino groups, tetrazotization and conversion with sodium azide;

4,4' - diazidostilbene-2,2'-bis-sulfanilide, corresponding to Formula 18, is prepared by condensation of 4,4'-dinitrostilbene-2,2'-disulfonyl chloride with aniline, catalytic reduction of the dinitro compound, tetrazotization and reaction with sodium azide;

4-azidobenzal-methyl-vinyl-ketone-2-sulfonic acid sodium salt, corresponding to Formula 19, is prepared by a process analogous to that described in German Patent No. 752,852, by condensation of 4-azido-2-benzaldehyde-sulfonic acid sodium salt with methyl-vinyl-ketone.

4,4'-diazido-5,5'-dichlorostilbene-2,2'-disulfonic acid sodium salt, corresponding to Formula 20, is prepared from 4,4'-dinitro-5.5'-dichlorostilbene-2,2'-disulfonic acid sodium salt by catalytic reduction, tetrazotization and reaction with sodium azide;

4,4' - diazidostilbene - 2,2'-bis-(sulfonamido-4''-phenylhydroxyethylether), corresponding to Formula 21, is prepared by condensation of 1 mole of 4,4'-diazodostilbene-2,2'-disulfonyl chloride with 2 moles of β-hydroxy-p-phenetidine.

Provided with hardened polyamide coatings and resistant even to boiling water, the screen-printing stencils may, in the interest of improved visibility, be inked up with dyestuffs up to quantities amounting to 0.1 to 0.5 percent by weight. In particular, dyestuffs which absorb ultraviolet light only slightly are used, e.g., Methyl Violet BB (Schultz' Farbstofftabellen, 7th edition, vol. 1 (1931), p. 327, No. 783), Patent Blue V (ibid., p. 349, No. 826), Rosaniline Hydrochloride (ibid. p. 324, No. 780) or New Fuchsin (ibid., p. 326, No. 782). The screen-printing stencils are not attacked by inking pastes with a high caustic content, hence they enable Naphthol AS dyestuffs to be used in screen and film printing. Moreover, they are resistant to most common solvents such as acetone, ether, ethyl acetate, butyl acetate, glycols, benzene and its homologues and also chlorinated hydrocarbons. Thus, it is possible for classes of coloring materials and coloring processes to be used which can not be used with stencils with tanned coatings consisting of water-soluble products such as gelatine, polyvinyl alcohol, and the like.

Moreover, the coatings of the invention, if sensitized with aromatic azido compounds, have an advantage over coatings hitherto known in that they keep well and can be stored in a sensitized condition. Further, adherence of the tanned layer to the porous support is excellent even without any treatment. Because of the excellent keeping qualities and the mechanical and chemical resistance of the coatings, it is possible for mass-production work to be performed therewith, in particular in mechanical film printing, even where aqueous caustic alkaline inks, e.g., Naphthol AS dyestuffs, are used and in the coloring of ceramic and glassware, in which glycerine, oil, water and caustic pastes are used. The coatings, although extremely thin, are extraordinarily strong and enable a very fine application of color to be made so that much less coloring material is required. It is, consequently, possible for the finest details of the stencil to be copied without distortion by direct printing, a fact which is particularly valuable in multicolor screen and film printing, in particular in the case of gold coloring work in the ceramic and glass industries. The coatings are suitable for use in office duplication work as well as for film and screen printing.

The invention will be further illustrated by reference to the following specific examples:

*Example 1*

A solution of 2.5 parts by weight of 4,4'-diazidostilbene-2,2'-disulfonic acid sodium salt in 10 parts by volume of 50 percent aqueous ethylene-glycol monomethylether is added, with stirring, to 90 parts by volume of a 10 percent solution, prepared with 80 percent ethyl alcohol, of an N-methoxy-methylated, partially broken-down polycondensate of polyadipic acid hexamethylene diamine, with a K-value of 57.8, an intrinsic viscosity ($\eta$) of 0.58, and a methoxy content of 6–8 percent. The light-sensitive solution, after being cooled to room temperature, is coated, either by a simple immersion and draining process, or by means of a spray gun upon a porous material, suitable for screen printing stencils, which serves as support e.g., Japanese-fiber paper, a synthetic polyamide or polyester tissue, pure silk or artificial silk, woven glass fiber or woven metal, e.g., copper-bronze or stainless steel. It is dried at 90–100° C. This material, which for practical purposes has almost unlimited shelf life in the light-sensitive state and is unaffected by changes in temperature and atmospheric humidity, is exposed to light behind a transparent master. The exposure time depnds on the type of master and the light source used; if the master contains very fine detail, it may be an advantage for point-light arc lamps to be used, so that light-diffusion effects are avoided. If an 18-amp enclosed carbon arc lamp is used at a distance of 50–70 cm., a tanned image is produced in about one to two minutes. However, it can be an advantage for the exposure to be prolonged somewhat, e.g., until the material takes on a yellow-brown or red-brown color, which will occur in about 2.5 to 5 minutes. The exposed material is then placed in 60–80 percent aqueous ethyl alcohol, at a temperature of about 20° C., so that those portions of the coating not struck by light are dissolved away. It is recommended that the treatment with 60–80 percent ethyl alcohol at room temperature be once or twice repeated in order that any non-hardened polyamide that may still be clinging to the support is removed.

For the removal of those portions of the polyamide coating not struck by light, and hence untanned, other lower alcohols such as methyl alcohol or a propyl alcohol may be used with equal success in place of the ethyl alcohol, the mixture thereof with water being in the same proportions. Alcoholic mixtures with less than 40 percent of alcohol are not so suitable for the preparation of the tanned images for stencils. The stencils produced in this way are excellently suited for very prolonged use. Screen and film printing can thus be done by machine, as the stencil has great mechanical strength and great elasticity.

N-alkoxyalkylated partially broken-down polycondensates from adipic acid hexamethylene diamine, in cases where formaldehyde is employed in association with allyl alcohol or ethyl alcohol or n-propyl alcohol for the introduction of the alkoxyalkyl groups, may be used with equally good results instead of the N-methoxymethylated partially broken-down polycondensates from adipic acid hexamethylene diamine. The chemical and physical properties of these N-propenoxymethyl or N-ethoxy-methyl or N-proproxymethyl substituted polycodensates from adipic acid hexamethylene diamine as well as their K-values and intrinsic viscosities are similar to those of the polycondensate used in this example.

Example 2

The coating of the porous support is performed as described in Example 1 except that a solution of 2.5 parts by weight of ammonium bichromate in 10 parts by volume of distilled water is used instead of the solution of 2.5 parts by weight of 4,4'-diazidostilbene-2,2'-disulfonic acid sodium salt, and the coated light-sensitive solution is dried at a temperature not over 40° C. A stencil very suitable for screen printing and film printing and also for office duplicating purposes is likewise obtained.

Example 3

A screen-printing stencil is obtained by the procedure described in Example 1, but for the coating of the porous support a polycondensate of sebacic acid hexamethylene diamine is used which has been obtained by partial decomposition with concentrated hydrochloric acid in alcoholic solution followed by partial N-methoxy-methylation and has a K-value of 57.6, an intrinsic viscosity ($\eta$) of 0.57 and a methoxy group content of 6–8 percent. After exposure to light under a photographic master, those portions of the coating not struck by light are removed by treatment with 60 percent ethyl alcohol at room temperature.

Example 4

Two parts by weight of the tetrazoborofluoride from 4,4'-diaminostilbene, dissolved in 20 parts by volume of dioxane, are added to 80 parts by volume of a 10 percent solution, prepared with 80 percent ethyl alcohol, of an N-methoxymethylated polycondensate of polyadipic acid hexamethylene diamine with a K-value of 57.8, an intrinsic viscosity ($\eta$) of 0.58 and a methoxy group content of 6–8 percent. The light-sensitive solution is coated at room temperature upon a support, e.g., textile fabric made of a synthetic polyamide or a polyester such as polyethylene glycol terephthalic acid ester, by a process of immersion, draining and doctoring with a stiff sheet of, e.g., Astralon foil, dried at room temperature and exposed to light under a suitable diapositive. If an enclosed 18-amp carbon arc lamp is used at a distance of 50–70 cm. as a light source, an exposure time of about 8–10 minutes produces an altered, cross-linked polyamide as a result of the liberation of hydrofluoboric acid from the diazo borofluoride decomposed under the influence of light and the consequent splitting off of the methoxy group. In comparison with the N-methoxymethylated polyadipic acid hexamethylene diamine, this product is characterized by very great resistance to dilute mineral acids, such as hydrochloric acid. For the removal of those portions of the coating not struck by light, the surface is treated with 60–80 percent ethyl alcohol at room temperature. It is advantageous for this treatment with 68–80 percent ethyl alcohol to be repeated once or twice so that any polyamide still clinging to the support is removed. Instead of ethyl alcohol, other aliphatic alcohols, such as methyl or isopropyl alcohol, may be used, the proportions for mixture with water being the same.

Stencils obtained by this process are very suitable for long runs in screen and film printing and in particular for direct printing with pastes containing hydrofluoric acid for the etching of glass. Two parts by weight of the diazoborofluoride of p-aminodiphenylamine, dissolved in 20 parts by volume of ethyleneglycol monomethylether, may be used instead of the tetrazo-borofluoride of 4,4'-diaminostilbene.

Example 5

In the light-sensitive polyamide coating solutions described in Examples 1–3 the light-sensitive substances are replaced by one of the following aromatic azido compounds, in the quantity stated:

2.5 parts by weight of 4-azidobenzalacetone-2-sulfonic acid potassium salt, corresponding to Formula 6,
1.0 part by weight of 4,4'-diazidostilbene, corresponding to Formula 8,
1.0 part by weight of 4-(4'-azido-$\beta$-methylstyryl)-pyridine, corresponding to Formula 13,
2.5 parts by weight of 2-(4'-azidostyryl)-6-azido-benzimidazole, corresponding to Formula 15,
2.5 parts by weight of 4-azidostilbene-2,2'-disulfonic acid sodium salt, corresponding to Formula 14,
2.5 parts by weight of 4-azido-4'-hydroxystilbene-2,2'-disulfonic acid sodium salt,
2.5 parts by weight of 4,4'-diazido-5,5'-dichlorostilbene-2,2'-disulfonic acid sodium salt, corresponding to Formula 20,
2.0 parts by weight of 4-azidobenzal-methylvinylketone-2-sulfonic acid sodium salt, corresponding to Formula 19,
2.0 parts by weight of 4,4'-diazidostilbene-2,2'-bis-sulfonamide, corresponding to Formula 17.
2.0 parts by weight of 4,4'-diazidostilbene 2,2'-bis-sulfanilide, corresponding to Formula 18, or
2.0 parts by weight of 4,4'-diazidostilbene-2,2'-bis-(sulfonamido - 4" - phenyloxyethylether), corresponding to Formula 21.

The light-sensitive material obtained with these coating solutions by the process described in Example 1 is exposed to light behind a diapositive and the parts not affected by the light are removed by treatment with 60 to 80 percent ethyl alcohol at room temperature. Very resistant stencils are similarly obtained.

It will be obvious to those skilled in the art that many modifications may be made within the scope of the present invention without departing from the spirit thereof, and the invention includes all such modifications.

What is claimed is:
1. Light sensitive material comprising a porous base material having a coating thereon comprising a light sensitive compound capable of rendering the coating insoluble in aqueous alcohol upon exposure to light and an N-alkoxy methylation product of a partially depolymerized polycondensate consisting of the monomeric units of a $\omega,\omega'$-diamine condensed with a $\omega,\omega'$-dicarboxylic acid.
2. Light sensitive material according to claim 1 in which the methylation product is soluble in aqueous alcohol at low temperatures.
3. Light sensitive material according to claim 1 in which the methylation product has a K-value of about 30 to 60, an intrinsic viscosity of about 0.43 to 0.62, and about 20 to 35 percent alkoxymethylation.
4. Light sensitive material according to claim 1 in which the light sensitive compound is a bichromate.
5. Light sensitive material according to claim 1 in which the light sensitive compound is a light sensitive diazonium salt soluble in organic solvents.
6. Light sensitive material according to claim 1 in which the light sensitive compound is a diazoborofluoride.

7. Light sensitive material according to claim 1 in which the light sensitive compound is an aryl azido compound.

8. Light sensitive material according to claim 1 in which the light sensitive compound has the formula

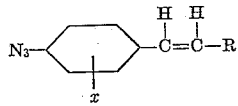

in which R is selected from the group consisting of aliphatic, aromatic and heterocyclic radicals, and $x$ is selected from the group consisting of hydrogen, a water-soluble alkali salt-forming group, and $—SO_2—NH—R_1$, in which $R_1$ is an aryl group.

9. A process for making screen printing stencils which comprises exposing a coated porous base material to light under a master, the coating comprising a light sensitive compound capable of rendering the coating insoluble in aqueous alcohol upon exposure to light and an N-alkoxy methylation product of a partially depolymerized polycondensate consisting of the monomeric units of a $\omega,\omega'$-diamine condensed with a $\omega,\omega'$-dicarboxylic acid, and treating the exposed coating with a solvent, whereby the non-light struck portions thereof are removed.

10. A process according to claim 9 in which the solvent is an aqueous alcohol.

11. A process according to claim 9 in which the methylation product is soluble in aqueous alcohol at low temperatures.

12. A process according to claim 9 in which the methylation product has a K-value of about 30 to 60, an intrinsic viscosity of about 0.43 to 0.62, and about 20 to 35 percent alkoxymethylation.

13. A process according to claim 9 in which the light sensitive compound is a bichromate.

14. A process according to claim 9 in which the light sensitive compound is a diazoborofluoride.

15. A process according to claim 9 in which the light sensitive compound is an aryl azido compound.

16. A process according to claim 9 in which the light sensitive compound has the formula

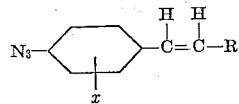

in which R is selected from the group consisting of aliphatic, aromatic and heterocyclic radicals, and $x$ is selected from the group consisting of hydrogen, a water-soluble alkali salt-forming group, and $—SO_2—NH—R_1$, in which $R_1$ is an aryl group.

17. As a new article of manufacture a screen printing stencil which comprises a porous base material, said material being image-wise coated with a resist comprising a hardened N-alkoxy-methylation product of a partially depolymerized polycondensate consisting of the monomeric units of a $\omega,\omega'$-diamine condensed with a $\omega,\omega'$-dicarboxylic acid.

References Cited in the file of this patent

UNITED STATES PATENTS

| | | |
|---|---|---|
| 2,412,993 | Larchar | Dec. 24, 1946 |
| 2,430,866 | Foster et al. | Nov. 18, 1947 |
| 2,972,540 | Saner et al. | Feb. 21, 1961 |

FOREIGN PATENTS

| | | |
|---|---|---|
| 790,131 | Great Britain | Feb. 5, 1958 |